United States Patent
Usui

(10) Patent No.: US 9,063,915 B2
(45) Date of Patent: Jun. 23, 2015

(54) MULTIPROCESSOR WITH A PLURALITY OF DEBUG MODULES AND DEBUG RING UNITS CONNECTED TO GENERATE A RING

(75) Inventor: Hiroyuki Usui, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 261 days.

(21) Appl. No.: 13/595,792

(22) Filed: Aug. 27, 2012

(65) Prior Publication Data

US 2013/0326203 A1    Dec. 5, 2013

(30) Foreign Application Priority Data

Jun. 1, 2012    (JP) ................... 2012-125899

(51) Int. Cl.
*G06F 11/22* (2006.01)
*G06F 11/36* (2006.01)
*G06F 11/27* (2006.01)

(52) U.S. Cl.
CPC ........ *G06F 11/2242* (2013.01); *G06F 11/3656* (2013.01); *G06F 11/27* (2013.01)

(58) Field of Classification Search
CPC ............ G06F 11/2236; G06F 11/2242; G06F 11/2294; G06F 11/22; G06F 11/2205; G06F 11/27; G06F 11/2733; G06F 11/2736
USPC .................................................... 714/25, 27
See application file for complete search history.

(56) References Cited

U.S. PATENT DOCUMENTS

| | | | |
|---|---|---|---|
| 5,600,819 A | | 2/1997 | Kamada et al. |
| 5,931,953 A | * | 8/1999 | Lesmeister ............ 713/500 |
| 5,951,703 A | * | 9/1999 | Sprouse et al. ........... 714/730 |
| 6,223,228 B1 | * | 4/2001 | Ryan et al. ............. 713/375 |
| 7,610,537 B2 | * | 10/2009 | Dickinson et al. .......... 714/733 |
| 8,046,638 B2 | * | 10/2011 | Bloching et al. ............ 714/31 |
| 8,555,123 B2 | * | 10/2013 | Wu et al. .................. 714/727 |
| 8,799,715 B2 | * | 8/2014 | Gulati et al. ............. 714/34 |
| 2010/0153786 A1 | | 6/2010 | Matsukawa |

FOREIGN PATENT DOCUMENTS

| | | |
|---|---|---|
| JP | S63-109546 | 5/1988 |
| JP | H03-018958 | 1/1991 |
| JP | H06-266615 | 9/1994 |
| JP | H07-120343 | 12/1995 |

(Continued)

OTHER PUBLICATIONS

Notification of Reason for Rejection for Japanese Patent Application No. 2012-125899, mailed Mar. 20, 2015 in 10 pages.

*Primary Examiner* — Joseph Schell

(74) *Attorney, Agent, or Firm* — Knobbe, Martens, Olson & Bear LLP

(57) ABSTRACT

A microprocessor has a plurality of debug modules, multiple sets of processor cores provided corresponding to the debug modules so that each set of the processor cores are debugged by the corresponding debug module, and a plurality of debug ring units provided corresponding to the debug modules, each debug ring unit generating a debug ring signal for instructing the corresponding processor cores to transit to a debug mode. The debug ring units are connected to generate a ring and sequentially transmit the debug ring signal, and when receiving the debug ring signal, each debug ring unit outputs, to the corresponding debug module, a debug transition signal for instructing the corresponding processor cores to transit to the debug mode.

20 Claims, 4 Drawing Sheets

(56) References Cited

FOREIGN PATENT DOCUMENTS

| | | |
|---|---|---|
| JP | 2005-122375 | 5/2005 |
| JP | 2007-141200 | 6/2007 |
| JP | 2009-025907 | 2/2009 |
| JP | 2010-140240 | 6/2010 |
| JP | 2010-277142 | 12/2010 |
| JP | 2011-159192 | 8/2011 |

* cited by examiner

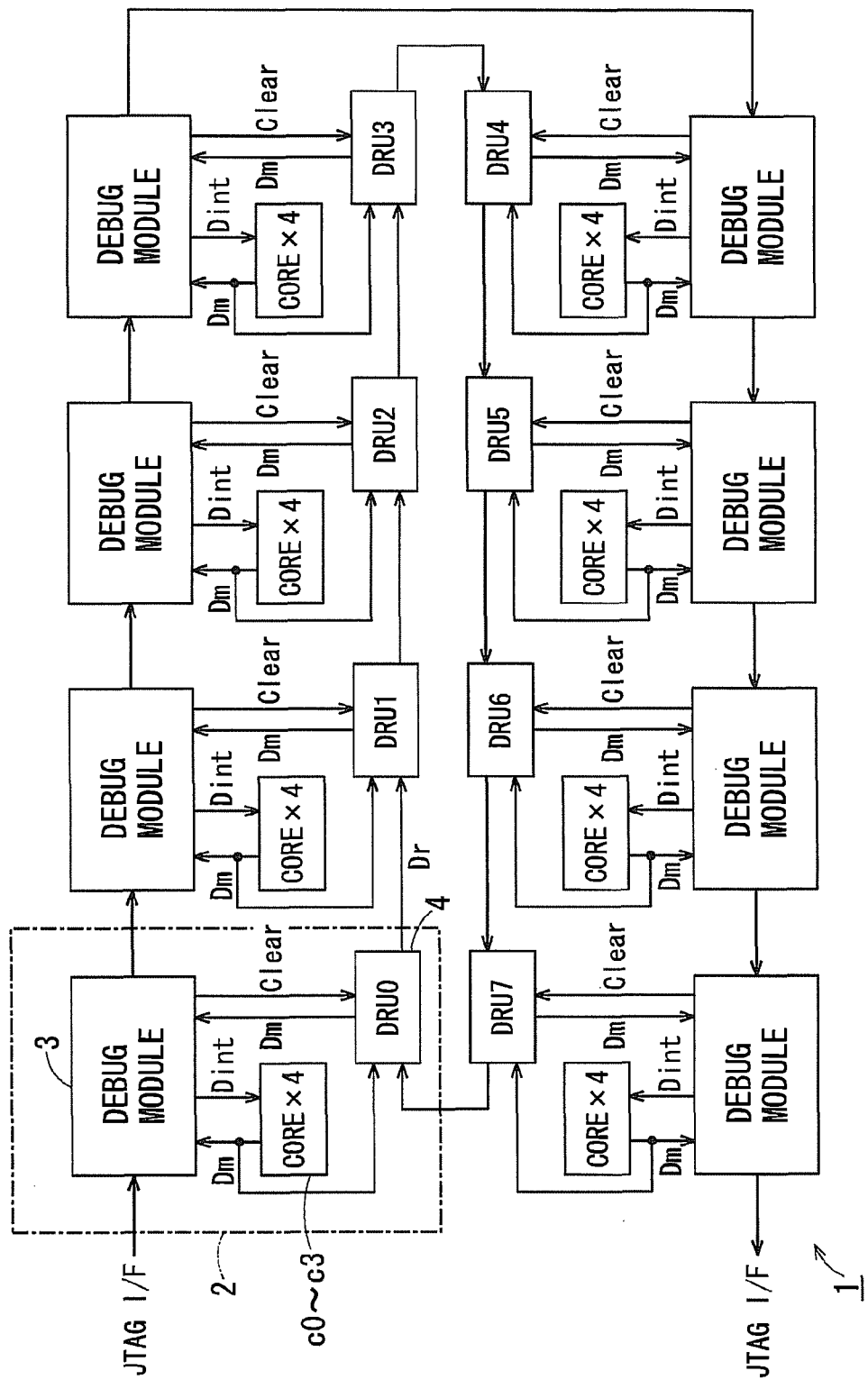
F I G. 1

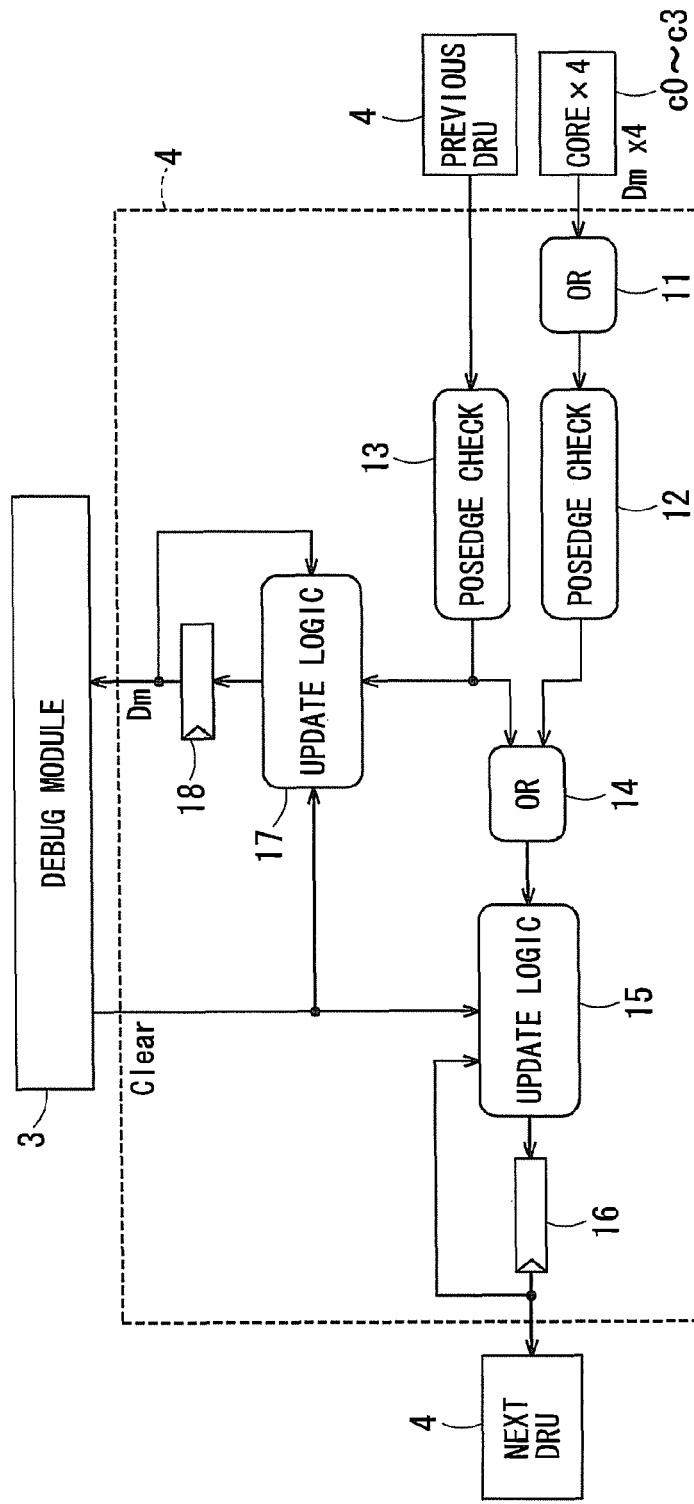
F I G. 2

| FF | INPUT | CLEAR | OUTPUT |
|----|-------|-------|--------|
| 0  | 0     | x     | 0      |
| 0  | 1     | x     | 1      |
| 1  | x     | 0     | 1      |
| 1  | x     | 1     | 0      |
F I G. 3
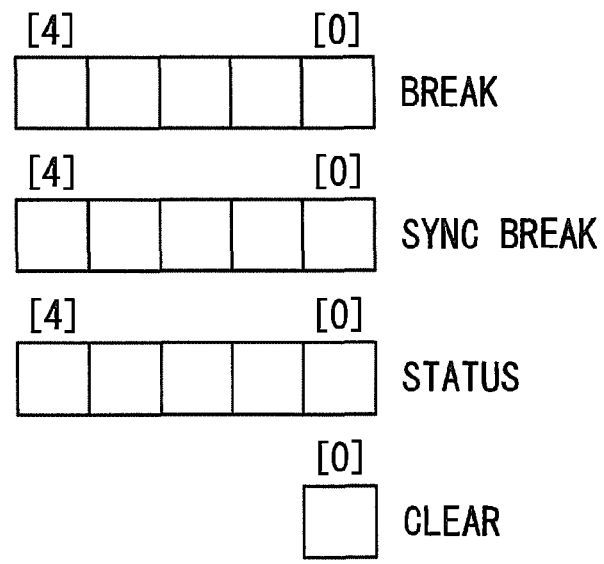
F I G. 4

MULTIPROCESSOR WITH A PLURALITY OF DEBUG MODULES AND DEBUG RING UNITS CONNECTED TO GENERATE A RING

CROSS REFERENCE TO RELATED APPLICATIONS

This application is based upon and claims the benefit of priority from the prior Japanese Patent Application No. 2012-125899, filed on Jun. 1, 2012, the entire contents of which are incorporated herein by reference.

FIELD

Embodiment of the present invention relate to a multiprocessor having debug modules.

BACKGROUND

A multiprocessor having a plurality of processor cores is widely used. Inside of the multiprocessor may be provided with a debug module which mainly debugs the processing operation of the processor cores. Generally, only one debug module is provided to the multiprocessor, and a plurality of processor cores are connected to this debug module. When one of the processor cores transits to the debug mode, device interrupts are generated to the other processor cores so that all of the processor cores transition to the debug mode. The debug module can be controlled from the outside of the multiprocessor through a JTAG interface standardized based on IEEE 1149.1.

When the number of processor cores is not so large, the multiprocessor having the conventional configuration can perform debug without any problem. However, as the number of processor cores increases the wire length between each processor core and the debug module becomes long since the multiprocessor has only one debug module, thereby increasing restrictions on timing due to the delay in signal transmission and making the wiring difficult.

BRIEF DESCRIPTION OF THE DRAWINGS

FIG. 1 is a block diagram showing a schematic structure of a multiprocessor 1 according to an embodiment.

FIG. 2 is a block diagram showing the internal structure of each debug ring unit 4 shown in FIG. 1.

FIG. 3 is a table showing the logical operation performed by a first update logic unit 15 and a second update logic unit 17.

FIG. 4 is a diagram showing the data structure of four registers included in each debug module 3.

DETAILED DESCRIPTION

Figure 5:
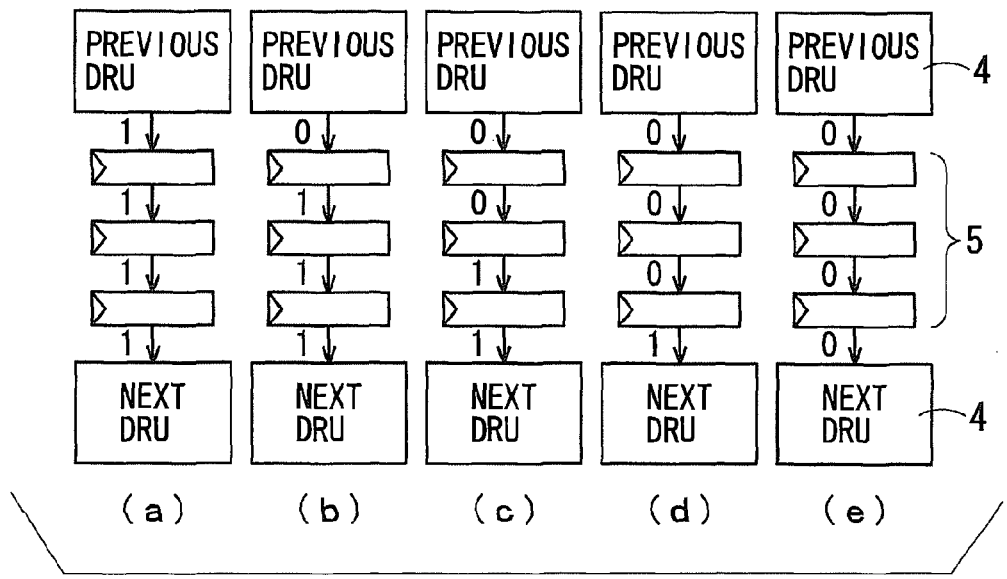
FIG. 5 is a diagram showing an example where three flip-flops 5 are inserted between the debug ring units 4.

According to one embodiment, a microprocessor has a plurality of debug modules, multiple sets of processor cores provided corresponding to the debug modules so that each set of the processor cores are debugged by the corresponding debug module, and a plurality of debug ring units provided corresponding to the debug modules, each debug ring unit generating a debug ring signal for instructing the corresponding processor cores to transit to a debug mode. The debug ring units are connected to generate a ring and sequentially transmit the debug ring signal, and when receiving the debug ring signal, each debug ring unit outputs, to the corresponding debug module, a debug transition signal for instructing the corresponding processor cores to transit to the debug mode.

Embodiments will now be explained with reference to the accompanying drawings.

FIG. 1 is a block diagram showing a schematic structure of a multiprocessor 1 according to an embodiment. The multiprocessor 1 of FIG. 1 has a plurality of core debug units 2 connected in cascade. In the example shown in FIG. 1, eight core debug units 2 are connected, but there is no limitation on the number of core debug units 2 to be connected.

Each core debug unit 2 has a debug module 3, a plurality of processor cores c0 to c3, and a debug ring unit 4. In the example shown in FIG. 1, each core debug unit 2 is provided with four processor cores c0 to c3, but there is no particular limitation on the number of processor cores in each core debug unit 2.

The debug module 3 debugs the processing operation of the corresponding processor cores c0 to c3, by starting or stopping the operation of the processor cores c0 to c3 and providing the real-time trace of the processor cores c0 to c3, for example. Note that the debug module 3 can also debug a memory, but the memory is omitted in FIG. 1 for simplification. The debug modules 3 are connected in cascade, and the debug modules 3 adjacent to each other are connected through a JTAG interface.

A multiplexer may be provided to select a plurality of debug modules 3, instead of connecting the debug modules 3 in cascade. Even in such a case, the internal structure of each core debug unit 2 is similar to FIG. 1.

The debug ring unit 4 generates a debug ring signal Dr for instructing the corresponding processor cores c0 to c3 to transit to a debug mode. More specifically, the debug ring unit 4 sets the debug ring signal Dr to a specific logic (e.g. 1).

Further, the debug ring units 4 are connected to form a ring. Therefore, the debug ring signal Dr outputted from one debug ring unit 4 is sequentially transmitted to the other debug ring units 4, and turned back to the debug ring unit 4 which initially outputted the debug ring signal. Accordingly, the debug ring unit 4 which initially outputted the debug ring signal Dr first recognizes, when the debug ring signal Dr turns back thereto, that the debug ring signal Dr has been transmitted to all of the debug ring units 4. Note that the debug ring units 4 of FIG. 1 are assigned with symbols DRU 0 to DRU 7.

Flip-flops 5 may be inserted between the debug ring units 4 adjacent to each other, in order to adjust timing. The number of flip-flops 5 to be inserted between each adjacent pair of debug ring units 4 connected to form a ring may be different between each adjacent pair.

When transiting to the debug mode, each of the processor cores c0 to c3 outputs a debug transition signal Dm. More specifically, each of the processor cores c0 to c3 sets the debug transition signal Dm to a specific logic (e.g. 1). Further, the debug ring unit 4 transmits the debug transition signal Dm to the debug module 3 when the debug ring signal Dr is inputted from the debug ring unit 4 in the previous stage.

As stated above, each of the processor cores c0 to c3 and debug ring unit 4 outputs the debug transition signal Dm, which means that totally five debug transition signals Dm are generated in one core debug unit 2. Each of these debug transition signals Dm is inputted into the corresponding debug module 3.

The debug module 3 outputs debug interrupt signals Dint corresponding to the processor cores c0 to c3. Further, the debug module 3 outputs a clear signal Clear to the corresponding debug ring unit 4. The clear signal Clear clears the debug ring signal Dr and debug transition signal Dm outputted from the debug ring unit 4.

FIG. 2 is a block diagram showing the internal structure of each debug ring unit 4. The debug ring unit 4 of FIG. 2 has a first OR circuit 11, a first positive edge check unit (first logic change detector) 12, a second positive edge check unit (second logic change detector) 13, a second OR circuit 14, a first update logic unit 15, a first F/F unit 16, a second update logic unit 17, and a second F/F unit 18. The first OR circuit 11 and the first positive edge check unit 12 form a first debug transition detector, and the second positive edge check unit 13 serves as the first debug transition detector and a second debug transition detector. The second OR circuit 14, the first update logic unit 15, and the first F/F unit 16 form a first debug transition transmitter, and the second update logic unit 17 and the second F/F unit 18 form a second debug transition transmitter.

The first OR circuit 11 calculates the logical sum of the debug transition signals Dm outputted from the processor cores c0 to c3. When any one of the processor cores c0 to c3 transits to the debug mode, it outputs the debug transition signal Dm at High logic level. Therefore, when any one of the processor cores c0 to c3 transits to the debug mode, the first OR circuit 11 outputs 1.

The first positive edge check unit 12 outputs e.g. 1 when detecting that the output from the first OR circuit 11 transits from 0 to 1. Therefore, when any one of the processor cores c0 to c3 transits to the debug mode, the first positive edge check unit 12 outputs 1.

The second positive edge check unit 13 outputs e.g. 1 when detecting that the debug ring signal Dr outputted from the debug ring unit 4 in the previous stage transits from 0 to 1. Therefore, the second positive edge check unit 13 outputs 1 when receiving the debug ring signal Dr at High logic level from the debug ring unit 4 in the previous stage.

The second OR circuit 14 outputs the logical sum of the output signals from the first positive edge check unit 12 and the second positive edge check unit 13. Accordingly, the second OR circuit 14 outputs "1" when any one of the processor cores c0 to c3 transits to the debug mode, or when the debug ring signal Dr has been transmitted from the debug ring unit 4 in the previous stage.

The first update logic unit 15 and the second update logic unit 17 operate in accordance with the truth-value table shown in FIG. 3. In FIG. 3, "FF" field shows the output from the first F/F unit 16 or the second F/F unit 18. "INPUT" field shows the input signal of the first update logic unit 15 or the second update logic unit 17. "CLEAR" field shows the logic of the clear signal Clear. "OUTPUT" field shows the output from the first update logic unit 15 or the second update logic unit 17.

As shown in FIG. 2, the output from the first update logic unit 15 is fed back through the first F/F unit 16. Similarly, the output from the second update logic unit 17 is fed back through the second F/F unit 18.

When the output FF from the first F/F unit 16 is 0, the first update logic unit 15 outputs the same logic as INPUT. When the output FF from the first F/F unit 16 is 1, the first update logic unit 15 outputs a signal at the logic level reverse to that of the clear signal Clear, regardless of the logic level of INPUT. That is, when the output FF from the first F/F unit 16 is 0, the first update logic unit 15 outputs a signal corresponding to the logic level of INPUT, while when the output from the first F/F unit 16 is 1, the first update logic unit 15 outputs 0 if the clear signal Clear is 1 or continuously retains the logic level of the output FF if the clear signal Clear is 0. The second update logic unit 17 similarly operates in accordance with the logic applied to the first update logic unit 15.

The first F/F unit 16 outputs the debug ring signal Dr to the debug ring unit 4 in the next stage. The second F/F unit 18 outputs the debug transition signal Dm to the debug module 3. The debug module 3 supplies the clear signal Clear to the first update logic unit 15 and the second update logic unit 17. When the clear signal Clear becomes 1, both of the first update logic unit 15 and the second update logic unit 17 output 0.

The debug module 3 has registers. FIG. 4 is a diagram showing the data structure of four registers included in each debug module 3. Specifically, the debug module 3 has a Break register; a SyncBreak register, a Status register, and a Clear register. Each of the Break register, SyncBreak register, and Status register has five bits, each bit corresponding to the four processor cores c0 to c3 and debug ring unit 4. More specifically, least significant bit [0] corresponds to the processor core c0, bit [1] corresponds to the processor core c1, bit [2] corresponds to the processor core c2, bit [3] corresponds to the processor core c3, and most significant bit [4] corresponds to the debug ring unit 4.

The Break register records whether a debug interrupt is generated, and a bit value of 1 shows that a debug interrupt is generated. When any one of the processor cores c0 to c3 or the debug ring unit 4 is assigned with a bit value of transits to the debug mode, the Break register changes its bit value to 0.

The SyncBreak register expresses the processor cores c0 to c3 or the debug ring unit 4 required to synchronously transit to the debug mode. Here, the bit corresponding to the requirement is specified as 1. When the Status register transits from an all-zero state, the SyncBreak register searches a bit which is 1 in the SyncBreak register but 0 in the Status register, and if found, sets the corresponding bit in the Break register to 1.

The Status register records the information showing whether each of the processor cores c0 to c3 or the debug ring unit 4 is in the debug mode. When the Status register is in an all-zero state, the current logic levels of the debug transition signals Dm of the processor cores c0 to c3 and the debug ring unit 4 are written in the corresponding bits of this register. Once the Status register shifts from the all-zero state, the current logic levels of the debug transition signals Dm are not written any more. Only when the Status register is cleared to zero, the current Dm logic levels are written again.

For example, when all of the processor cores c0 to c3 are required to synchronously transit to the debug mode, the lower four bits of the SyncBreak register are set to "1111." Here, if the processor core c0 transits to the debug mode, the lower four bits of the Status register become "0001," and the lower four bits of the Break register become "1110." Accordingly, interrupts to the processor cores c1 to c3 are generated, and all of the processor cores c0 to c3 can transit to the debug mode in synchronization with the interrupt signals.

The Clear register has only one bit allowing write operation only. The Clear register shows whether the clear signal Clear should be activated. When 1 is written in the Clear register, the clear signal Clear for the corresponding debug ring unit 4 becomes 1 only for one cycle.

Settings of the four kinds of registers can be controlled by a host computer (not shown) through a JTAG interface. Further, each bit value of three kinds of registers except for the Clear register can be read from the host computer through the JTAG interface.

Next, the processing operation of the multiprocessor 1 according to the present embodiment will be explained hereinafter. When all of the processor cores (32 in the case of FIG.

1) in the multiprocessor 1 are required to synchronously transit to the debug mode, every SyncBreak register is set to "11111." When the four processor cores c0 to c3 are in a normal operation mode, the signals Dm inputted into the first OR circuit 11 are all 0. Accordingly, both of the first OR circuit 11 and the first positive edge check unit 12 output 0, and the debug ring signal Dr at Low logic level is supplied to the debug ring unit 4 in the next stage.

Further, since the debug ring signal Dr outputted from the debug ring unit 4 in the previous stage is also 0, each of the second positive edge check unit 13, the second update logic unit 17, and the second F/F unit 18 outputs 0. Therefore, the debug transition signal Dm supplied from the debug ring unit 4 to the debug module 3 is 0.

Here, it is assumed that the processor core c0 connected to the debug ring unit DRU 0 transits to the debug mode. In this case, the debug transition signals Dm inputted into the first OR circuit 11 represent "0001." The first OR circuit 11 outputs 1, and the first positive edge check unit 12 also outputs 1. Therefore, the second OR circuit 14 also outputs 1, and the first update logic unit 15 outputs 1 in accordance with the logic shown in FIG. 3. When the first update logic unit 15 outputs 1, the first F/F unit 16 also outputs 1, which is fed back to the first update logic unit 15. Since the clear signal Clear is 0 in this state, the output from the first update logic unit 15 remains 1.

Accordingly, the debug ring signal Dr at High logic level is transmitted to the debug ring unit DRU 1 in the next stage.

On the other hand, the debug ring signal Dr from the debug ring unit DRU 7 in the previous stage is 0, and thus the second positive edge check unit 13 outputs 0. Accordingly, the debug transition signal Dm outputted from the second F/F unit 18 remains 0.

As stated above, when any one of the processor cores c0 to c3 corresponding to the debug ring unit DRU 0 transits to the debug mode, the debug ring signal Dr transmitted to the debug ring unit DRU 1 in the next stage becomes 1, while the debug transition signal Dm transmitted to the debug module 3 remains 0.

At this time, the Status register of the debug module 3 corresponding to the debug ring unit DRU 0 has a value of "00001," and the Break register has a value of "11110." In this way, debug interrupts to the processor cores c1 to c3 are generated. When the processor cores c1 to c3 have transited to the debug mode responding to the debug interrupt, corresponding bits of the Break register return to 0. However, the most significant bit 4 of the Break register remains 1 since the debug transition signal Dm outputted from the second F/F unit 18 remains 0.

Next, the operation of the debug ring unit DRU 1 in the next stage will be explained hereinafter. When the debug ring signal Dr from the debug ring unit DRU 0 in the previous stage becomes 1, the second positive edge check unit 13 outputs 1, and each of the second OR circuit 14, the first update logic unit 15, and the first F/F unit 16 also outputs 1. Accordingly, the debug ring signal Dr at High logic level is transmitted to the debug ring unit DRU 2 in the next stage.

Further, when the second positive edge check unit 13 outputs 1, each of the second update logic unit 17 and the second F/F unit 18 also outputs 1, and the debug transition signal Dm at High logic level is supplied to the debug module 3.

Therefore, the Status register of the debug module 3 corresponding to the debug ring unit DRU 1 has a value of "10000," and the Break register has a value of "01111" to generate debug interrupts to the processor cores c0 to c3. When the processor cores c0 to c3 have transited to the debug mode responding to the debug interrupts, corresponding bits of the Break register return to 0.

As stated above, the debug ring units 4 sequentially transmit the debug ring signal Dr at High logic level. Further, when the debug ring signal Dr at High logic level is transmitted from the debug ring unit 4 in the previous stage, the debug transition signal Dm to be outputted to the debug module 3 also becomes 1.

The debug ring signal Dr at High logic level from the debug ring unit DRU 0 is sequentially transmitted to be finally transmitted from the debug ring unit DRU 7 to the debug ring unit DRU 0. Accordingly, the second positive edge check unit 13 in the debug ring unit DRU 0 outputs 1, and the debug transition signal Dm becomes 1 correspondingly. The debug module 3 receives this debug transition signal Dm and sets the most significant bit [4] of the Break register to 0.

As stated above, the debug ring unit DRU 0 initially outputs the debug ring signal Dr at High logic level, and when the debug ring signal Dr at High logic level is transmitted from the debug ring unit DRU 7 in the previous stage, the debug ring unit DRU 0 sets the debug transition signal Dm to 1 recognizing that the debug ring signal Dr at High logic level has been transmitted to all of the debug ring units DRU 0 to DRU 7.

Based on the above steps, when any one of the 32 processor cores transits to the debug mode, it is possible to set all of the other processor cores transition to the debug mode. When it is required to find the processor core which has initially transited to the debug mode, the Status register of each debug module 3 should be referred to. If any one of the bits [0] to [3] of the Status register is 1, the processor core corresponding to the bit is the processor core which has transited to the debug mode first. When the bit [4] is 1, the processor core which has initially transited to the debug mode is not included in the processor cores c0 to c3 connected to that debug module 3.

When returning from the debug mode to the normal mode, all of the debug ring units 4 must be cleared to zero. If not cleared to zero, the mode which has returned to the normal mode by setting the Status register to zero is shifted to the debug mode again since the debug transition signal Dm from the debug ring unit 4 remains 1. When clearing the debug ring units 4 to zero, 1 is written in all of the Clear registers. According to JTAG interface specifications, information can be simultaneously written in the registers of all of the debug modules 3. As a result, both of the first F/F unit 16 and the second F/F unit 18 output 0.

Here, it is important that when the flip-flops 5 are inserted between the debug ring units 4, 1 is written in the Clear register, and the first F/F unit 16 and the second F/F unit 18 output 0, the flip-flops 5 between the debug ring units 4 continuously output 1.

Generally, the flip-flops 5 are inserted when there is a great distance between the debug ring units 4 adjacent to each other. It is extremely difficult, in terms of timing, to initialize the flip-flops 5 by the debug module 3. For example, when three flip-flops 5 are inserted between the debug ring units 4 as shown in FIG. 5, the debug ring signal Dr of each component is 1 before clearing the debug ring unit 4 (FIG. 5(a)). When the debug ring unit 4 is cleared in this state, the debug ring unit 4 outputs 0, but the flip-flops 5 between the debug ring units 4 do not output 0 (FIG. 5(b)). After that, 0 is transmitted between the flip-flops 5 each time a clock signal is inputted (FIG. 5(c), FIG. 5(d)), and when three clock cycles have passed, finally all of the flip-flops 5 output 0 (FIG. 5(e)).

Figure 6:
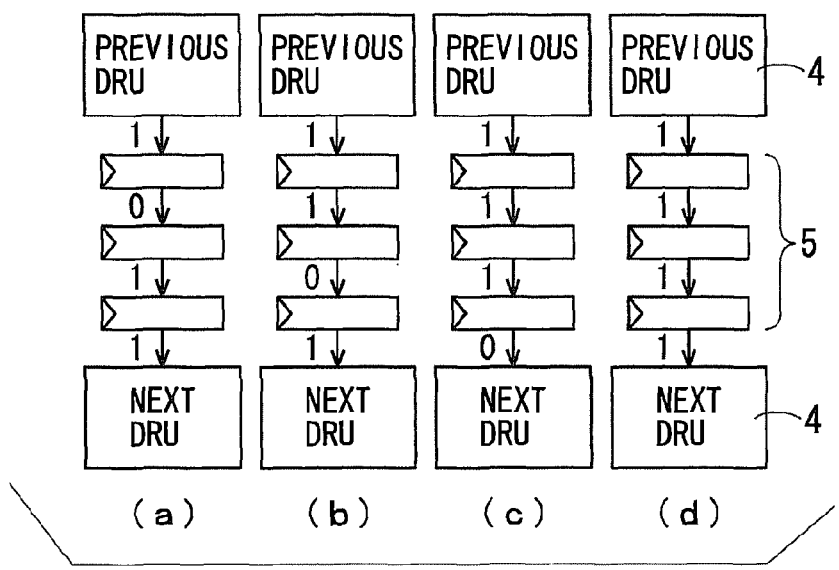
FIG. 6 is a diagram showing an example where all of the debug ring units 4 are cleared to zero, and immediately after that, any one of processor cores c0 to c3 transits to a debug mode again.

FIG. 6 is a diagram showing an example where all of the debug ring units 4 are cleared to zero, and immediately after that, any one of the processor cores c0 to c3 transits to the debug mode again. In this case, as shown in FIG. 6(a), the output from the debug ring unit 4 returns to 1 while the debug ring signal Dr having a value of 0 is transmitted through the flip-flops 5 between the debug ring units 4. As shown in FIGS. 6(b) to (c), the flip-flops 5 sequentially transmit 0, and when the debug ring signal Dr having a value of 1 is transmitted to the debug ring unit 4 in the next stage again (FIG. 6(d)), the debug ring unit 4 in the next stage transits to the debug mode.

As stated above, in the present embodiment, when any one of the processor cores c0 to c3 in the multi-core processor transits to the debug mode, all of the other processor cores c0 to c3 can synchronously transit to the debug mode.

Further, in the present embodiment, since the debug module 3 and the debug ring unit 4 are arranged for each set of processor cores, the wire length between the debug module 3 and each processor core is not large, thereby reducing restrictions on timing due to the delay in signal transmission. When a large number of processor cores are arranged, the processor cores should be divided into a desired number of groups to increase the number of debug modules 3 and debug ring units 4 corresponding to the number of groups. Even when the number of processor cores is increased, the wire length between each processor core and the debug module 3 is not increased.

Further, in the present embodiment, the debug ring units 4 are connected to form a ring, and information showing that any one of the processor cores c0 to c3 has transited to the debug mode is transmitted between the debug ring units 4. Accordingly, the information that any one of the processor cores c0 to c3 has transited to the debug mode can be shared among all of the debug ring units 4. Further, since the debug ring units 4 are connected to form a ring, the debug ring unit 4 which initially outputted the debug ring signal Dr to inform the transition to the debug mode can grasp that the information has been transmitted to all of the debug ring units 4 by receiving the debug ring signal Dr from the debug ring unit 4 in the previous stage. This makes it possible to recognize that all of the processor cores have transited to the debug mode.

Further, in the present embodiment, since an arbitrary number of flip-flops 5 can be connected between the debug ring units 4, no timing problem is caused in synchronization even when there is a great distance between the debug ring units 4 adjacent to each other, or when the number of the processor cores c0 to c3 is increased.

As stated above, according to the present embodiment, even when the number of processor cores is increased, there is no need to redesign the debug module 3. By increasing or reducing the number of debug modules 3 and debug ring units 4 depending on the number of processor cores c0 to c3, various multi-core processors different in the number of processor cores can be easily designed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A microprocessor comprising:
a plurality of debug modules;
multiple sets of processor cores provided corresponding to the debug modules so that each set of the processor cores are debugged by the corresponding debug module; and
a plurality of debug ring units provided corresponding to the debug modules, each debug ring unit generating a debug ring signal for instructing the corresponding processor cores to transition to a debug mode,
wherein the debug ring units are connected to generate a ring and sequentially transmit the debug ring signal, and when receiving the debug ring signal, each debug ring unit outputs, to the corresponding debug module, a debug transition signal for instructing the corresponding processor cores to transition to the debug mode.

2. The multiprocessor of claim 1,
wherein the debug ring unit comprises:
a first debug transition detector configured to detect that at least one of the processor cores has transitioned to the debug mode; and
a first debug transition transmitter configured to output the debug ring signal to the debug ring unit in a next stage when the first debug transition detector detects that at least one of the processor cores has transitioned to the debug mode,
wherein each of the debug modules sets all of the processor cores to the debug mode when the first debug transition detector detects that at least one of the processor cores has transitioned to the debug mode.

3. The multiprocessor of claim 2,
wherein the debug ring unit comprises:
a second debug transition detector configured to receive the debug ring signal from the debug ring unit in a previous stage; and
a second debug transition transmitter configured to output the debug transition signal to the corresponding debug module when the second debug transition detector receives the debug ring signal.

4. The multiprocessor of claim 3,
wherein the debug module comprises a clear register configured to clear the debug ring signal and the debug transition signal.

5. The multiprocessor of claim 4,
wherein the debug module comprises:
a Break register configured to generate a debug interrupt;
a SyncBreak register configured to generate an interrupt to the processor cores required to be synchronously debugged; and
a Status register configured to inform whether the debug mode is currently active.

6. The multiprocessor of claim 5,
wherein each of the Break register, SyncBreak register, and Status register has bit values each assigned to the processor cores and the corresponding debug ring unit.

7. The multiprocessor of claim 3,
wherein the first debug transition detector comprises:
a first OR circuit configured to calculate a logical sum of the debug transition signals outputted from the corresponding processor cores; and
a first logic change detector configured to detect that an output from the first OR circuit has changed to a predetermined logic.

8. The multiprocessor of claim 7,
wherein the second debug transition detector comprises a second logic change detector configured to detect that the debug ring signal outputted from the debug ring unit in the previous stage has changed to the predetermined logic.

9. The multiprocessor of claim 8,
wherein the first debug transition transmitter comprises:
a second OR circuit configured to calculate a logical sum of an output from the first logic change detector and an output from the second logic change detector; and
a first update logic unit configured to generate the debug ring signal, by a logic operation of an output from the second OR circuit and a clear signal from the corresponding debug module, and
the second debug transition transmitter comprises:
a second update logic unit configured to generate the debug transition signal, by a logic operation of the output from the second logic change detector and the clear signal from the corresponding debug module.

10. The multiprocessor of claim 1, further comprising:
a flip-flop configured to be inserted between the debug ring units.

11. A multiprocessor, comprising:
a plurality of core debug units each comprising a debug module, a plurality of processor cores configured to be debugged by the debug module, and a debug ring unit configured to output, to the debug module, a debug ring signal,
wherein the core debug units are connected to generate a ring through the debug ring units and sequentially transmit the debug ring signal, and
when an arbitrary processor core has transitioned to the debug mode, the core debug unit allows all of the processor cores to transition to the debug mode, based on the debug ring signal.

12. The multiprocessor of claim 11,
wherein the debug ring unit comprises:
a first debug transition detector configured to detect that at least one of the processor cores has transitioned to the debug mode; and
a first debug transition transmitter configured to output the debug ring signal to the debug ring unit in a next stage when the first debug transition detector detects that at least one of the processor cores has transitioned to the debug mode.

13. The multiprocessor of claim 12,
wherein the debug ring unit comprises:
a second debug transition detector configured to receive the debug ring signal from the debug ring unit in a previous stage; and
a second debug transition transmitter configured to output the debug transition signal to the debug module when the second debug transition detector receives the debug ring signal.

14. The multiprocessor of claim 13,
wherein the debug module comprises a clear register configured to clear the debug ring signal and the debug transition signal.

15. The multiprocessor of claim 14,
wherein the debug module comprises:
a Break register configured to generate a debug interrupt;
a SyncBreak register configured to generate an interrupt to the processor cores required to be synchronously debugged; and
a Status register configured to inform whether the debug mode is currently active.

16. The multiprocessor of claim 15,
wherein each of the Break register, SyncBreak register, and Status register has bit values each assigned to the processor cores and the debug ring unit.

17. The multiprocessor of claim 13,
wherein the first debug transition detector comprises:
a first OR circuit configured to calculate a logical sum of the debug transition signals outputted from at least one of the processor cores; and
a first logic change detector configured to detect that an output from the first OR circuit has changed to a predetermined logic.

18. The multiprocessor of claim 17,
wherein the second debug transition detector comprises a second logic change detector configured to detect that a debug ring signal outputted from the debug ring unit in the previous stage has changed to the predetermined logic.

19. The multiprocessor of claim 18,
wherein the first debug transition transmitter comprises:
a second OR circuit configured to calculate a logical sum of an output from the first logic change detector and an output from the second logic change detector; and
a first update logic unit configured to generate a debug ring signal to be transmitted to the debug ring unit in a next stage, based on an output from the second OR circuit and a clear signal from the debug module, and
the second debug transition transmitter has:
a second update logic unit configured to generate the debug transition signal to be transmitted to the debug module, based on the output from the second logic change detector and the clear signal from the debug module.

20. The multiprocessor of claim 11, further comprising:
a flip-flop configured to be inserted between the debug ring units.

* * * * *